July 16, 1968  C. W. CHANCELLOR, JR  3,393,012
SEAT CUSHION
Filed Oct. 19, 1966

Charles W. Chancellor, Jr.
INVENTOR.

BY
Attorneys

3,393,012
SEAT CUSHION

Charles W. Chancellor, Jr., Midland, Tex., assignor to Chancellor Chair Company, a corporation of Texas
Filed Oct. 19, 1966, Ser. No. 587,789
2 Claims. (Cl. 297—458)

ABSTRACT OF THE DISCLOSURE

A seat cushion including a rigid frame forming a contoured surface for receiving the posterior region of a seated person. A thick layer of resilient cushioning material is inserted within the frame and a plurality of plastic coil spring members are completely embedded within the resilient material. The spring members are bonded at both ends thereof to the rigid frame.

---

The present invention generally relates to cushion devices and more specifically a seat cushion which may be incorporated into a seat that is preferably in the form of an independent cushion which can be placed on any desired supporting surface to form a seat cushion.

An object of the present invention is to provide a seat cushion incorporating a contoured surface for engagement by the posterior regions of a person occupying the seat cushion and including novel cushioning means disposed in underlying relation to the contoured surface that combines the cushioning effect of a cellular resilient material such as foam rubber or foam plastic together with a coil spring assembly in which the coil springs are preferably constructed of plastic and the cellular resilient material and the coil springs are orientated so that the coil springs are completely embedded in the resilient cushioning material and conversely the resilient cushioning material completely covers the coil springs except at the ends where the coil springs are connected with the contoured surface and an underlying supporting surface for the cushion.

Another object of the present invention is to provide a seat cushion in the form of a rigid supporting member having a relatively thick layer of cellular foam resilient material thereon together with a contoured rigid plate carried by the upper surface of the resilient material and bonded thereto for forming a resilient support for the rigid contoured plate.

Still a further object of the present invention is to provide a seat cushion in accordance with the preceding object together with coil springs embedded in the resilient cellular material and being attached to the bottom plate and the rigid shell for combining with the cellular resilient material to form an effective cushioning of the rigid contoured shell.

Yet a further important object of the present invention is to provide a seat cushion which is provided with a fabric covering and incorporating the features set forth in the preceding objects thereby enabling the cushion to be shape sustaining and yet easily portable for orientation in different areas where a seat cushion is desired with the structure being relatively inexpensive, long lasting and durable, effective for producing a desired cushioning effect and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Referring now specifically to the drawings, the numeral 10 generally designates the seat cushion of the present invention which includes a rigid supporting plate or base 12 which may be of metal, wood, rigid plastic or any other suitable rigid material to form the base or supporting plate for the seat cushion. The base or plate 12 may be an independent structure if the seat cushion is to be portable or may be attached stationarily or removably to any supporting bracket or other supporting structure.

Figure 1:
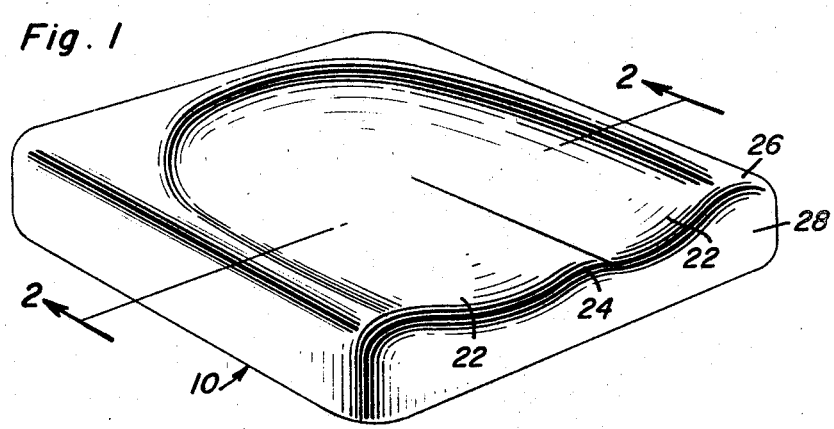
FIGURE 1 is a perspective view of the seat cushion of the present invention.
Figure 2:
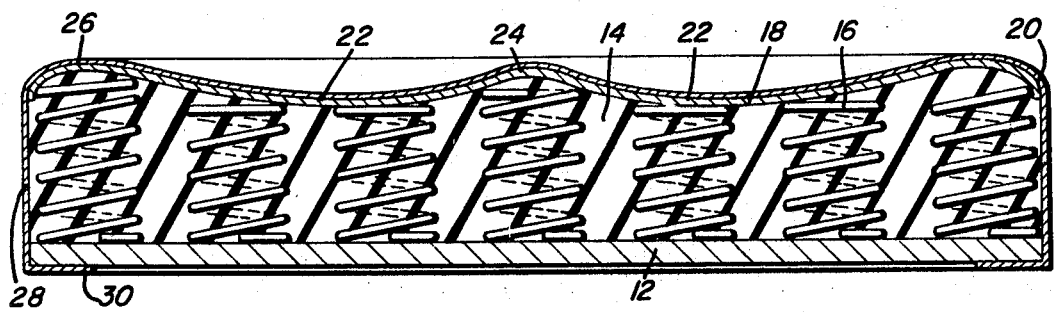
FIGURE 2 is a transverse, sectional view of the seat cushion on an enlarged scale taken substantially upon a plane passing along section line 2—2 of FIGURE 1.
Figure 3:
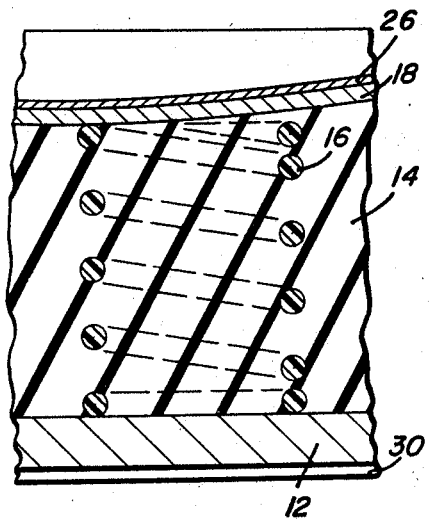
FIGURE 3 is a detailed sectional view, on an enlarged scale, taken through the center of one of the supporting springs.

Disposed in overlying relation to the base or plate 12 is a relatively thick layer of resilient cellular material 14 such as foam rubber or foam plastic which may be of monocellular construction in order to prevent absorption of moisture. Embedded in the cellular resilient material 14 is a plurality of coil springs 16 each of which is preferably constructed of plastic materal and each of which is completely embedded within the cellular resilient material 14 as illustrated in FIGURES 2 and 3. The lower ends of the coil springs 16 are attached to the plate 12 in any suitable manner such as by the use of a bonding adhesive or suitable holddown clips or the like. A commercially available epoxy bonding material may be employed for bonding the lower ends of the springs 16 to the plate 12 and a similar material may be employed for bonding the resilient cellular material to the plate 12.

Mounted on top of the resilient cellular material 14 is a rigid shell or plate 18 which is contoured to conform with the shape and configuration of the anatomy of a person who will occupy the seat cushion. The contoured shell or plate 18 may be constructed of sheet metal, plastic or the like and has downwardly curved peripheral edge portions 20 and a pair of downwardly offset concave areas 22 and a central longitudinally extending ridge or hump area 24. The upper ends of the spring 16 are attached to the undersurface of the rigid shell 18 by a suitable bonding material such as an epoxy adhesive or the like or may be attached thereto by suitable clips such as those employed for anchoring the ends of coil springs in various structures. The upper surface of the resilient cellular material 14 is also bonded to the undersurface of the shell 18 by a suitable bonding agent such as epoxy material or the like. Thus, the plate 12, cellular resilient material 14, shell 18 and springs 16 are so joined and connected to form a substantially unitary structure with the resiliency of the resilient cellular material and the springs 16 cooperating to effectively cushion the shell 18 in movement in any direction. In forming the structure, the resilient cellular material 14 may be formed in place so that it completely encircles and encloses the coil springs both interiorly and exteriorly thereof and between the convolutions thereof as illustrated in FIGURE 3.

A covering member 26 of fabric material, plastic material or the like is disposed over the shell 18 and is secured thereto as by an adhesive bonding agent or the like and the side edges of the fabric covering 26 extend downwardly as at 28 and terminate in inwardly extending peripheral edge portions 30 which underlie the peripheral edges of the plate 12 and are secured thereto by any suitable means such as by used of a bonding agent, small tacks or nails or any other suitable fastening means to secure the fabric cover in position on the seat cushion so that it conforms snugly with the periphery of a cushioning material 14 as well as the shell 18 and the fabric covering may be bonded to the shell and also to the resilient material by a suitable adhesive bonding agent so that the fabric cover will be retained in a neat condition but yet capable of flexing within the limits of movement of the shell 18 in relation to the plate 12.

It is pointed out that the plate 12 may be a heavy backing member of cardboard or may also be a flexible panel to provide a degree of rigidity to the cushion but also be somewhat flexible in itself to enable the cushion to conform with irregularities in a supporting surface such as when it is placed on a ground surface or the like thereby enabling the seat cushion to be quite versatile in use and efficient in providing a seat cushion in its many areas of use.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A seat cushion comprising a rigid shell forming a surface for receiving the posterior region of the anatomy of a person sitting upon the cushion, a thick layer of resilient cushioning material underlying said shell, and a plurality of coil spring members completely embedded within the resilient material and connected with the undersurface of the shell for cooperating with the resilient material to cushion movement of the shell, said resilient material being in the form of resilient cellular material, said coil spring members being in the form of plastic coil springs, said shell being of uniform thickness throughout its dimensions and terminating in a downwardly curved edge overlying and receiving a portion of the peripheral edge of the resilient material, both the undersurface and upper surface of the shell being contoured with the resilient material and coil spring members being attached thereto, a base member underlying and secured to the coil spring members and resilient material, a covering material for the shell, the periphery of the resilient material and the peripheral portion of the base member, said covering being in the form of a fabric material bonded to the shell and resilient material.

2. A seat cushion comprising a rigid shell forming a surface for receiving the posterior region of the anatomy of a person, a thick layer of resilient cushioning material underlying said shell, and a plurality of coil spring members completely embedded within the resilient material and connected with the undersurface of the shell for cooperating with the resilient material to cushion movement of the shell, said resilient material being in the form of resilient cellular material, said shell being of uniform thickness throughout its dimensions and terminating in a downwardly curved edge overlying and receiving a portion of the peripheral edge of the resilient material, both the undersurface and upper surface of the shell including a contour therein characterized by a U-shaped horizontal projection, the bight section of said projection protruding backwardly, said contour further characterized by a generally sinusoidal top front section connecting the free ends of the lateral arm sections of said U-shaped projection, said bight section being recessed concavely, a transverse profile of said generally sinusoidal top front section including two adjacently disposed concave portions in laterally spaced relation, and a backwardly tapering peaked portion connecting inwardly confronting surfaces of said generally sinusoidal top forward concave portions, and a rigid base member underlying said resilient material, said resilient material and said spring members abutting said rigid shell and base member and bonded thereto.

References Cited

UNITED STATES PATENTS

| 2,979,739 | 4/1961 | Krakauer | 5—345 |
| 3,084,926 | 4/1963 | Lemelson. | |
| 3,280,410 | 10/1966 | Propst et al. | 297—452 X |
| 3,325,834 | 6/1967 | Lovette et al. | 5—361 |

FOREIGN PATENTS

| 1,371,987 | 8/1964 | France. |
| 1,369,216 | 6/1964 | France. |
| 938,533 | 10/1963 | Great Britain. |

CASMIR A. NUNBERG, *Primary Examiner.*